April 28, 1925.
A. NYMAN
ELECTRICAL SYSTEM
Original Filed July 15, 1920
1,535,624
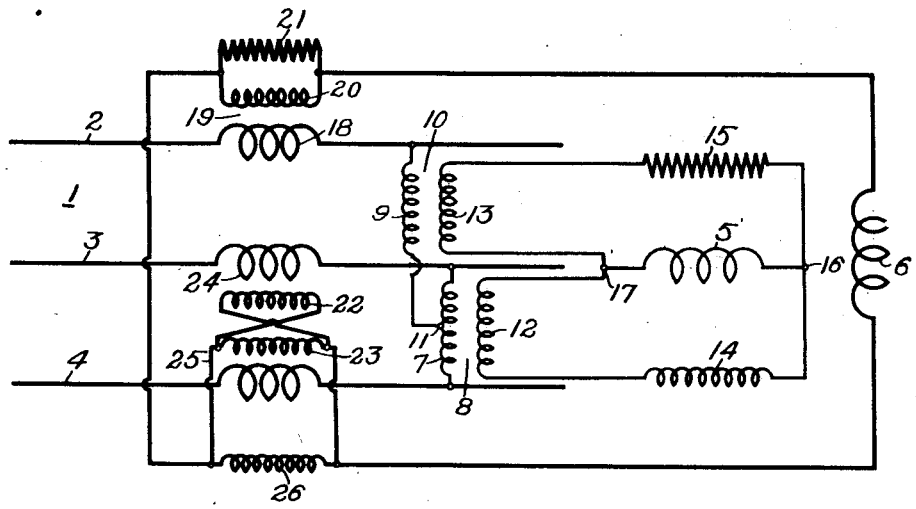
WITNESSES:
J. A. Helsel.
J. H. Procter
INVENTOR
Alexander Nyman.
BY
Wesley E. Carr
ATTORNEY Patented Apr. 28, 1925.

1,535,624

UNITED STATES PATENT OFFICE.

ALEXANDER NYMAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed July 15, 1920, Serial No. 396,529. Renewed February 16, 1925.

*To all whom it may concern:*

Be it known that I, ALEXANDER NYMAN, a citizen of the United States, and a resident of Wilkinsburg, in the county of Allegheny and State of Pennsylvania, have invented a new and useful Improvement in Electrical Systems, of which the following is a specification.

My invention relates to electrical systems and particularly to means for separating electrical quantities.

One object of my invention is to provide a device that shall be adapted to be actuated in accordance with the various phase-sequence components of voltage, current, power and power factor of polyphase electric circuits.

Another object of my invention is to provide a measuring device, of the above indicated character, that shall be simple and inexpensive to construct and effective in its operation.

It has been determined that any unbalanced polyphase quantity may be separated into a plurality of symmetrical components. This is clearly set forth in co-pending application Serial No. 358,373, filed Feb. 13, 1920, by C. L. Fortescue, L. W. Chubb and J. Slepian, and assigned to the Westinghouse Elec. & Mfg. Co.

In that application rotating apparatus is employed to segregate the several components into which an unbalanced polyphase quantity may be separated.

In my present invention, I utilize the broad principles set forth in the above mentioned application but obviate the necessity of using rotating apparatus and also reduce the apparatus necessary to obtain the desired result to a minimum.

In practicing my invention, I provide two potential transformers that are connected in T-relation to the circuit. The secondary windings of the transformers are connected in series with a reactor and a resistor, and an actuating winding is connected from a point between the resistor and the reactor to a point between the secondary windings of the transformer. The windings of the transformer and the resistor and reactor are so proportioned and connected that, when the three-phase circuit to which they are connected is balanced, no current traverses the actuating winding.

Three series transformers are provided and the secondary winding of one is connected in circuit with a resistor. The secondary windings of the other two transformers are connected in opposition and the circuit, thus constituted, is connected, in shunt relation, to a reactor.

An actuating winding is connected in series with the resistor and the reactor in such manner that, when a balanced load traverses the three-phase circuit, no current traverses the actuating winding. With the above arrangement, currents proportional to one phase-sequence component of the voltage and current, respectively, of the polyphase circuit traverse the respective actuating windings. By properly rearranging the transformers or the impedance devices, currents proportional to the other phase-sequence components may be obtained to energize the respective actuating windings.

The windings may be disposed to cooperate in any desired manner, as in standard instruments, to measure the power factor or power or other function of the obtained values when combined, or if they are used separately, an indication of the phase-sequence components of the voltage or current may be obtained.

The single figure of the accompanying drawings is a diagrammatic view of an electric circuit embodying my invention.

A three-phase circuit 1 comprises conductors 2, 3 and 4 across which an unbalanced voltage is impressed or which is so unequally loaded that the voltage thereacross is unbalanced. It is desired to separate or measure the phase-sequence components of the electrical quantities of the circuit and, for that purpose, two actuating windings 5 and 6 are provided.

The primary winding 7 of a potential transformer 8 is connected across the conductors 3 and 4. The primary winding 9 of a potential transformer 10 is connected, from the conductor 2, and the mid point 11 of the winding 7. With this three phase-two phase arrangement, the secondary windings 12 and 13 of the transformers 8 and 10 are adapted to generate equal voltages when the voltage across the circuit 1 is balanced. A reactor 14 and a resistor 15 are connected in circuit with the windings 12 and 13, and the actuating winding 5 is connected from a point 16, between the reactor 14 and the resistor 15, to a point 17 between the windings 12 and 13. The winding 5, it will be understood, is not traversed by current when the voltages of the circuit 1 are balanced. The resistor 15 is of such resistance and the reactor 14 is of such reactance that the voltages of the windings 12 and 13 are shifted to be in phase. Thus, if they are equal under balanced conditions of the circuit voltages there will be no voltage impressed across the points 16 and 17 and, consequently, no current will traverse the winding 5 under this condition.

The reactor 14 and the resistor 15 have equal values of impedance but the characteristic of the reactor 14 is such as to cause the current traversing the same to lag 90° behind an impressed electromotive force, while current traversing the resistor would be in phase with the applied voltage.

Thus, when the circuit voltages are balanced, the voltages across the terminals of the transformer windings 12 and 13 will be equal and 90° displaced. The two currents caused to flow by the respective transformer voltages will, therefore, be displaced 180° and in phase opposition. No current will, therefore, traverse the winding 5 under balanced-voltage conditions in the circuit. However, it has been found that when the voltages impressed on the circuit become unbalanced, the voltages of the windings 12 and 13 will be unbalanced and current will traverse the winding 5 in accordance with the negative sequence component of the voltages impressed across the circuit 1.

The primary winding 18 of a series transformer 19 is connected in circuit with the conductor 2, and its secondary winding 20 has a resistor 21 connected thereacross. The secondary windings 22 and 23 of the series transformers 24 and 25, the primary windings of which are connected in circuit with the conductors 3 and 4, are connected in opposition to each other in such manner that the voltage thereacross is in quadrature with the voltage across the winding 20 of the transformer 19.

The transformation ratios of the current transformers 19, 24 and 25 are such that the secondary current of transformer 19 is equal to the resultant current of both current transformers 24 and 25.

A reactor 26 is connected in shunt relation to the windings 22 and 23 to cause the voltage to be in phase with the voltage across the resistor 21. The characteristics of the resistor 21 and the reactor 26 are such that the voltages established thereacross by a common current would be equal in value and angularly displaced 90°. When the circuit currents are balanced, the resistor and the reactor will therefore have equal voltages established thereacross. The winding 6 is connected in series with the reactor 26 and the resistor 21, and, consequently, will not be traversed by current when the loads on the circuit 1 are balanced. However, it has been found that current will traverse the winding 6 when the load on the circuit is unbalanced which is proportional to the negative phase sequence component of the current traversing the circuit 1.

If the connections of the transformers 8 and 10 and 24 and 25 are changed with respect to the conductors 3 and 4, the winding 5 will be traversed by current proportional to the positive phase sequence component of the voltage of the circuit 1 and the winding 6 by current proportional to the positive phase sequence component of the current traversing the circuit 1. The winding 5 may constitute the actuating winding of a voltmeter or a voltage-responsive device and the winding 6 may constitute the actuating winding of an ammeter or other electro-responsive device. Also, the windings 5 and 6 may constitute the co-operating windings either of a watt-meter, a power-factor meter or other electro-responsive device. When the windings 5 or 6 are energized in accordance with the negative-phase-sequence components of the current or the voltage, they may be employed to measure the unbalance of a system, which measure may be used to determine the charge to be made for energy supplied to a load tending to unbalance the system.

By interchanging the reactor 14 and the resistor 15, the other phase-sequence component of voltage may be measured by the winding 5. The same result may be obtained by transposing the connections of any two terminals of the primary winding of the transformers 8 and 10 in connecting them to the main circuit conductors.

My invention is not limited to the specific structure illustrated as it may be variously modified and used in various applications, such as in measuring instruments, relays and regulators, without departing from the spirit and scope of the invention, as set forth in the appended claims.

I claim as my invention:

1. The combination with a three-phase electric circuit, of two transformers, a winding, and means for so connecting the transformers to the circuit and to the winding that current traverses the winding only when the three-phase circuit is unbalanced.

2. The combination with a three-phase electric circuit, of two transformers, a winding, and means for so connecting the transformers to the circuit and to the winding that the winding is traversed by current in accordance with one phase-sequence component of the voltage of the system.

3. The combination with a three-phase electric circuit, of two transformers, a winding and means for so connecting the transformers to the circuit and to the winding that the winding is traversed by current in accordance with the positive or negative phase-sequence component of the voltage of the system.

4. The combination with a three-phase electric circuit, of three current transformers, a winding, and means for so connecting the transformers to the circuit and to the winding that the winding is traversed by current proportional to one phase-sequence component of the current traversing the circuit.

5. The combination with a three-phase circuit, of three current transformers connected to the circuit, a resistor connected across one transformer, a reactor connected across the other two transformers, and a winding connected in series-circuit relation to the resistor and reactor.

6. The combination with a three-phase circuit, of three current transformers connected to the circuit, a resistor connected across one transformer, a reactor connected across the other two transformers, and a winding so connected to the resistor and the reactor that two equal and opposite potentials are impressed across the respective terminals of the winding when the circuit is balanced.

7. The combination with a three-phase circuit, of two potential transformers T-connected to the circuit, a resistor and a reactor connected to two terminals of the secondary windings of the transformers, and a winding connected from a point between the resistor and the reactor to a point between the secondary windings of the transformers.

8. The combination with a three-phase circuit, of two potential transformers the primary windings of which are connected to the three-phase circuit so that equal voltages are induced in the two secondary windings thereof when a balanced load traverses the three-phase circuit, an actuating winding connected to the secondary windings of the transformers, and means for shifting the phase of the current traversing one of the secondary windings.

9. The combination with a three-phase circuit, of three series transformers connected to the circuit, two potential transformers connected to the circuit, two co-operating windings, and means for so connecting the windings to the transformers that one winding is traversed by current proportional to one phase-sequence current of the circuit and the other by current proportional to the voltage of the circuit of the same phase sequence.

10. The combination with a three-phase circuit, of three series transformers, two potential transformers, two co-operating windings, a reactor connected in shunt relation to the secondary windings of two of the series transformers, a resistor connected in shunt relation to the secondary winding of the other series transformer, a reactor and a resistor connected in series with the secondary windings of the potential transformer, means for connecting one of the co-operating windings in series with one resistor and reactor, and means for connecting the other co-operating winding in shunt relation to the other resistor and reactor.

In testimony whereof, I have hereunto subscribed my name this 10th day of July 1920.

ALEXANDER NYMAN.